US012600141B2

(12) United States Patent
Otana et al.

(10) Patent No.: US 12,600,141 B2
(45) Date of Patent: Apr. 14, 2026

(54) INKJET RECORDING APPARATUS

(71) Applicant: KYOCERA Document Solutions Inc., Osaka (JP)

(72) Inventors: Aiichiro Otana, Osaka (JP); Takashi Somete, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 213 days.

(21) Appl. No.: 18/488,408

(22) Filed: Oct. 17, 2023

(65) Prior Publication Data

US 2024/0131847 A1 Apr. 25, 2024
US 2024/0227402 A9 Jul. 11, 2024

(30) Foreign Application Priority Data

Oct. 21, 2022 (JP) ................................ 2022-169003

(51) Int. Cl.
*B41J 2/17* (2006.01)
*B41J 11/00* (2006.01)
*B41J 2/185* (2006.01)

(52) U.S. Cl.
CPC ........... *B41J 2/1721* (2013.01); *B41J 2/1707* (2013.01); *B41J 11/007* (2013.01); *B41J 2002/1856* (2013.01)

(58) Field of Classification Search
CPC ...... B41J 2/1721; B41J 2/1707; B41J 11/007; B41J 2002/1856; B41J 2/185
See application file for complete search history.

(56) References Cited

U.S. PATENT DOCUMENTS

2001/0020962 A1* 9/2001 Kanaya .................. B41J 2/1721 347/29
2004/0085391 A1 5/2004 Kanaya et al. ................. 347/35
2013/0100202 A1* 4/2013 Ogasawara ............ B41J 2/1721 347/31
2024/0131846 A1* 4/2024 Otana .................... B41J 11/007

FOREIGN PATENT DOCUMENTS

JP H 06-340092 A 12/1994
JP 2000203058 A * 7/2000 ............ B41J 2/1721
JP 2010-023374 A 2/2010
WO WO 2022/004348 A1 1/2022

OTHER PUBLICATIONS

Chinese Office Action dated Nov. 15, 2025, issued to Chinese Application No. 202311358363.8.

* cited by examiner

*Primary Examiner* — Sharon Polk
(74) *Attorney, Agent, or Firm* — Stein IP, LLC

(57) ABSTRACT

An inkjet recording apparatus includes a recording head, a conveyance belt, a control portion, an ink collector, and a suction portion. The ink collector includes a plurality of ink receivers that receives ink that has passed through openings of the conveyance belt during execution of flushing, a waste ink tank disposed below the ink receivers, a suction path that is formed in the waste ink tank and leads from each of the ink receivers to the suction portion, and an ink absorber that is filled in the waste ink tank and absorbs the ink sucked from the ink receivers. The suction path is formed by void spaces surrounded by the ink absorber.

7 Claims, 7 Drawing Sheets

INKJET RECORDING APPARATUS

INCORPORATION BY REFERENCE

This application is based upon and claims the benefit of priority from the corresponding Japanese Patent Application No. 2022-169003 filed on Oct. 21, 2022, the entire contents of which are incorporated herein by reference.

BACKGROUND

The present disclosure relates to an inkjet recording apparatus.

Conventionally, in an inkjet recording apparatus such as an inkjet printer, in order to reduce or prevent clogging of nozzles due to drying of ink, flushing (idle ejection) is performed in which the ink is periodically ejected through the nozzles. For example, a conveyance belt that conveys a recording medium has openings provided therein, and ink is ejected through nozzles of a recording head to pass through the openings of the conveyance belt.

In the inkjet recording apparatus described above, ink droplets that have passed through the openings of the conveyance belt as a result of the flushing normally arrive on an ink receiver that receives the ink and are collected to be discharged as a waste liquid from the ink receiver. Here, if the ink receiver can be disposed in a neighborhood of an ink ejection surface of the recording head, substantially all the ink droplets can be collected by the ink receiver. However, since the conveyance belt is disposed between the recording head and the ink receiver, the ink receiver can hardly be disposed in the neighborhood of the ink ejection surface. As a result, the ink droplets turn into a mist before reaching the ink receiver, causing contamination inside the apparatus.

SUMMARY

An inkjet recording apparatus according to an aspect of the present disclosure includes a recording head, a conveyance belt, a control portion, an ink collector, and a suction portion. The recording head includes a plurality of nozzles for ejecting ink. The conveyance belt has a plurality of openings for the ink ejected from the recording head to pass through and conveys a recording medium. The control portion controls driving of the recording head and the conveyance belt so as to execute flushing in which, at a timing different from a timing contributing to image recording, the ink is ejected through the nozzles of the recording head to pass through any of the plurality of openings. The ink collector is disposed to be opposed to the recording head via the conveyance belt and collects the ink that has passed through the openings during execution of the flushing. The suction portion sucks air in the ink collector. The ink collector includes a plurality of ink receivers that receives the ink that has passed through the openings, a waste ink tank disposed below the ink receivers, a suction path that is formed in the waste ink tank and leads from each of the ink receivers to the suction portion, and an ink absorber that is filled in the waste ink tank and absorbs the ink sucked from the ink receivers. The suction path is formed by void spaces surrounded by the ink absorber.

DETAILED DESCRIPTION

1. Configuration of Inkjet Recording Apparatus

Figure 1:
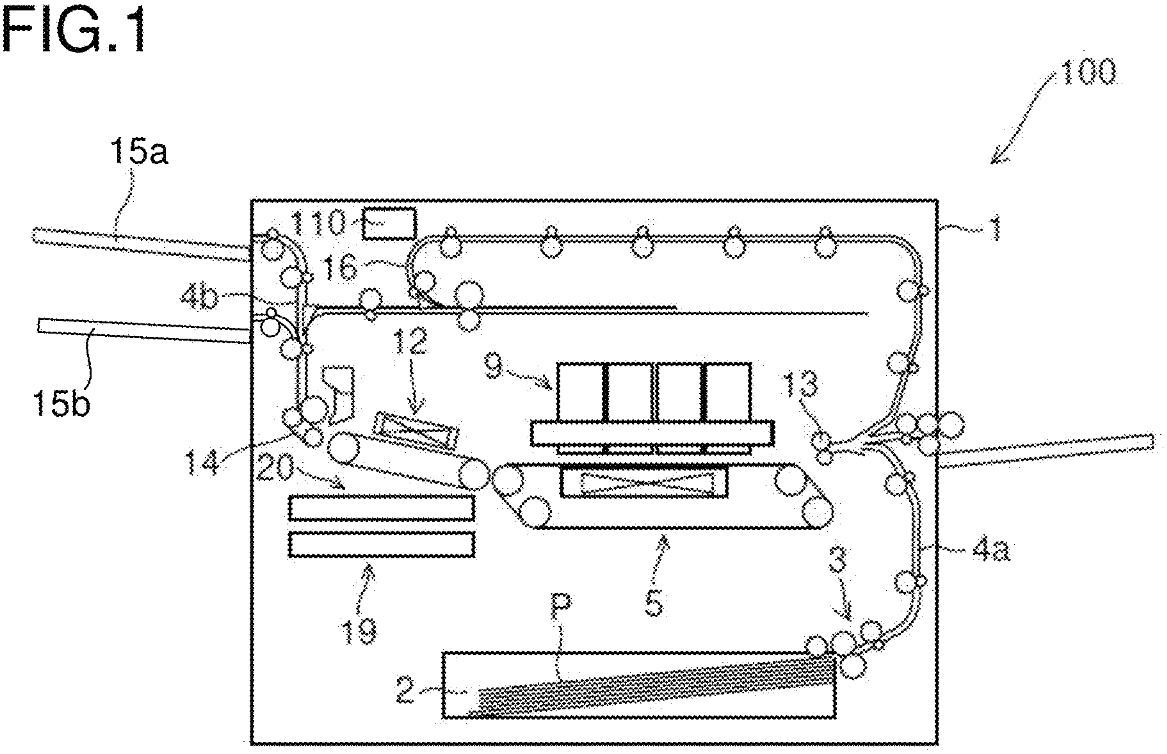
FIG. 1 is an explanatory view showing a schematic configuration of a printer as an inkjet recording apparatus according to an embodiment of the present disclosure.

With reference to the appended drawings, the following describes an embodiment of the present disclosure. FIG. 1 is an explanatory view showing a schematic configuration of a printer 100 as an inkjet recording apparatus according to the embodiment of the present disclosure. The printer 100 includes a paper feed cassette 2 that is a sheet housing portion. The paper feed cassette 2 is disposed on a lower side in a printer main body 1. A sheet P that is an example of a recording medium is housed in the paper feed cassette 2.

A paper feed device 3 is disposed on a downstream side of the paper feed cassette 2 in a sheet conveyance direction, i.e., at an upper right part of the paper feed cassette 2 in FIG. 1. By the paper feed device 3, the sheet P is fed out one by one separately toward an upper right side of the paper feed cassette 2 in FIG. 1.

The printer 100 includes therein a first sheet conveyance path **4*a*. With respect to the paper feed cassette 2, the first sheet conveyance path 4*a* is positioned on the upper right side, which corresponds to a paper feed direction of the paper feed cassette 2. Via the first sheet conveyance path 4*a*, the sheet P fed out from the paper feed cassette 2 is conveyed vertically upward along a side surface of the printer main body 1**.

A registration roller pair 13 is provided at a downstream end of the first sheet conveyance path **4*a* in the sheet conveyance direction. Moreover, a first conveyance unit 5 and a recording portion 9 are disposed in immediate proximity to a downstream part of the registration roller pair 13 in the sheet conveyance direction. The sheet P fed out from the paper feed cassette 2 passes through the first sheet conveyance path 4*a* to reach the registration roller pair 13. While correcting oblique feeding of the sheet P, the registration roller pair 13 feeds out the sheet P toward the first conveyance unit 5 (particularly, an after-mentioned first conveyance belt 8) in synchronization with an ink ejection operation executed by the recording portion 9**.

The sheet P fed out to the first conveyance unit 5 by the registration roller pair 13 is conveyed to an opposed position to the recording portion 9 (particularly, after-mentioned recording heads 17*a* to 17*c*) by the first conveyance belt 8. Ink is ejected from the recording portion 9 to the sheet P so that an image is recorded thereon. At this time, ejection of the ink in the recording portion 9 is controlled by a control device 110 in the printer 100.

A second conveyance unit 12 is disposed on a downstream side of the first conveyance unit 5 in the sheet conveyance direction (a left side in FIG. 1). The sheet P on which the image has been recorded by the recording portion 9 is sent to the second conveyance unit 12. The ink ejected to a surface of the sheet P is dried while the sheet P passes through the second conveyance unit 12.

A decurler portion 14 is provided on a downstream side of the second conveyance unit 12 in the sheet conveyance direction and in a neighborhood of a left side surface of the printer main body 1. The sheet P on which the ink has been dried by the second conveyance unit 12 is sent to the decurler portion 14 where a curl generated in the sheet P is corrected.

A second sheet conveyance path 4*b* is provided on a downstream side of the decurler portion 14 in the sheet conveyance direction (an upper side in FIG. 1). When duplex recording is not performed, the sheet P that has passed through the decurler portion 14 passes through the second sheet conveyance path 4*b* to be discharged onto a sheet discharge tray 15*a* provided outside a left side surface of the printer 100. Below the sheet discharge tray 15*a*, there is provided a sub-discharge tray 15*b* onto which, as the sheet P, a sheet (a waste sheet) on which a printing failure or the like has occurred is discharged.

An inversion conveyance path 16 for performing duplex recording is provided in an upper part of the printer main body 1 and above the recording portion 9 and the second conveyance unit 12. When duplex recording is performed, the sheet P that has passed through the second conveyance unit 12 and the decurler portion 14 after completion of recording on one side (a first side) thereof passes through the second sheet conveyance path 4*b* to be sent to the inversion conveyance path 16.

The conveyance direction for conveying the sheet P sent to the inversion conveyance path 16 is switched for subsequent recording on the other side (a second side) of the sheet P. Then, the sheet P passes through the upper part of the printer main body 1 to be sent rightward and is further sent, with the second side up, again to the first conveyance unit 5 via the registration roller pair 13. In the first conveyance unit 5, the sheet P is conveyed to the opposed position to the recording portion 9, and the ink is ejected from the recording portion 9 thereto so that an image is recorded on the second side. The sheet P after being subjected to the duplex recording sequentially passes through the second conveyance unit 12, the decurler portion 14, and the second sheet conveyance path 4*b* to be discharged onto the sheet discharge tray 15*a*.

Furthermore, a maintenance unit 19 and a cap unit 20 are disposed below the second conveyance unit 12. When executing purging, the maintenance unit 19 horizontally moves to below the recording portion 9 to wipe off the ink extruded through ink ejection ports of each of recording heads and to collect the ink thus wiped off. The purging refers to an operation of forcibly extruding the ink through the ink ejection ports of each of the recording heads so as to discharge thickened ink, foreign matter, and air bubbles in the ink ejection ports. When capping ink ejection surfaces of the recording heads, the cap unit 20 horizontally moves to below the recording portion 9 and further moves upward so as to be attached to lower surfaces of the recording heads.

Figure 2:
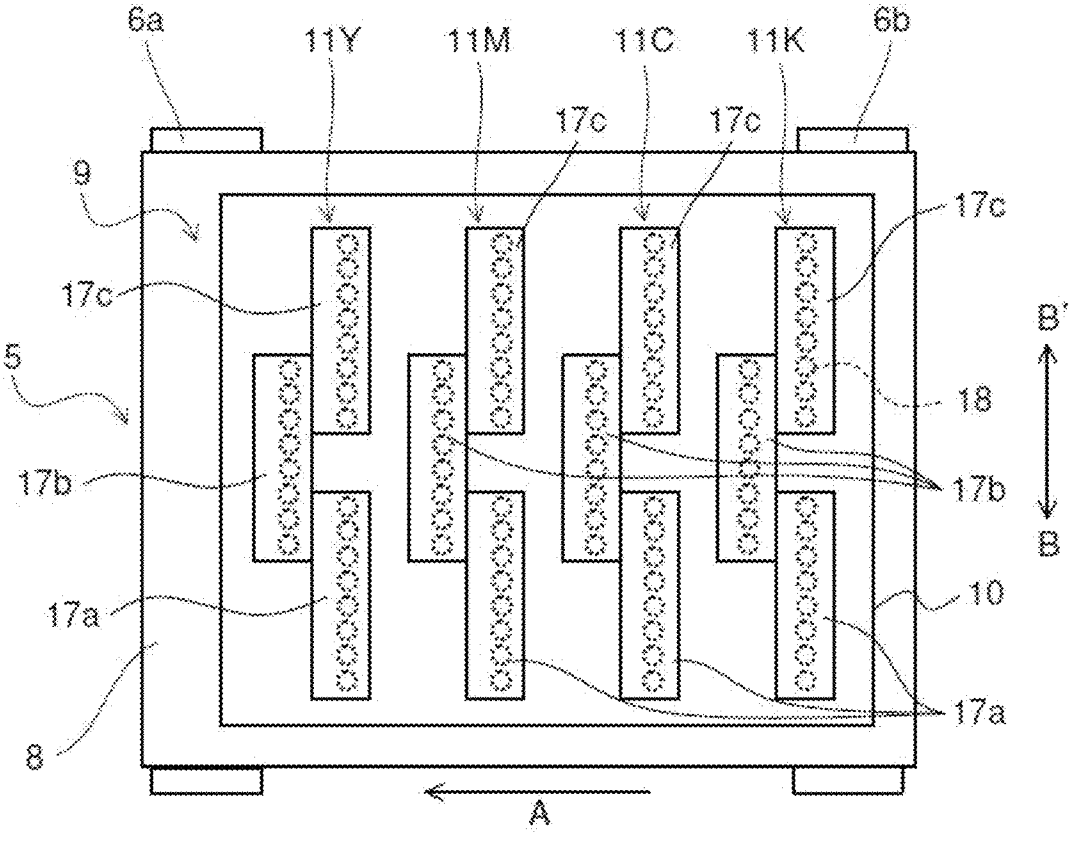
FIG. 2 is a plan view of a recording portion included in the above-described printer.

FIG. 2 is a plan view of the recording portion 9. The recording portion 9 includes a head housing 10 and line heads 11Y, 11M, 11C, and 11K. In the head housing 10, the line heads 11Y to 11K are held at a prescribed distance (for example, 1 mm) in level from a conveyance surface of the first conveyance belt 8, which is an endless belt stretched over a plurality of rollers including a driving roller 6*a*, a driven roller 6*b*, and tension rollers 7*a* and 7*b* (see FIG. 3). The driving roller 6*a* causes the first conveyance belt 8 to travel in the conveyance direction for conveying the sheet P (an arrow A direction). Driving of the driving roller 6*a* is controlled by a main control portion 110*a* (see FIG. 4) of the control device 110. The above-described plurality of rollers is disposed along a travelling direction of the first conveyance belt 8 in an order of the tension roller 7*a*, the tension roller 7*b*, the driven roller 6*b*, and the driving roller 6*a* (see FIG. 3).

The line heads 11Y to 11K each include the plurality of (herein, three) recording heads 17*a* to 17*c*. The recording heads 17*a* to 17*c* are arrayed in a staggered manner along a sheet width direction (an arrow B-B' direction) orthogonal to the sheet conveyance direction (the arrow A direction). The recording heads 17*a* to 17*c* each have a plurality of ink ejection ports 18 (nozzles). The ink ejection ports 18 are arranged at equal intervals in a recording head width direction, namely, the sheet width direction (the arrow B-B' direction). From the line heads 11Y to 11K, ink of respective colors of yellow (Y), magenta (M), cyan (C), and black (K) is ejected through the ink ejection ports 18 of the recording heads 17*a* to 17*c* toward the sheet P being conveyed on the first conveyance belt 8.

The recording heads 17*a* to 17*c* constituting each of the line heads 11Y to 11K are supplied with the ink of four different colors (yellow, magenta, cyan, and black) stored in ink tanks (not shown) so as to correspond to respective colors of the line heads 11Y to 11K.

Based on a control signal from the control device 110 (see FIG. 4), in accordance with image data received from an external computer, the recording heads 17*a* to 17*c* eject the ink through the ink ejection ports 18 toward the sheet P being conveyed while being absorbed to the conveyance surface of the first conveyance belt 8. Thus, on the sheet P on the first conveyance belt 8, there is formed a color image in which the four different colors, which are yellow, magenta, cyan, and black, of ink are superimposed on each other.

In the printer 100, in order to clean the ink ejection surfaces of the recording heads 17*a* to 17*c*, at a start of printing after long-term non-operation and between printing operations, in preparation for a subsequent printing operation, a recovery operation of the recording heads 17*a* to 17*c* is executed in which the ink is extruded (purged) through the ink ejection ports 18 of all the recording heads 17*a* to 17*c*, and the ink ejected to the ink ejection surfaces is wiped off by a wiper (not shown). The ink wiped off from the ink ejection surfaces is collected by after-mentioned ink collectors 31Y to 31K (see FIG. 3).

Figure 3:
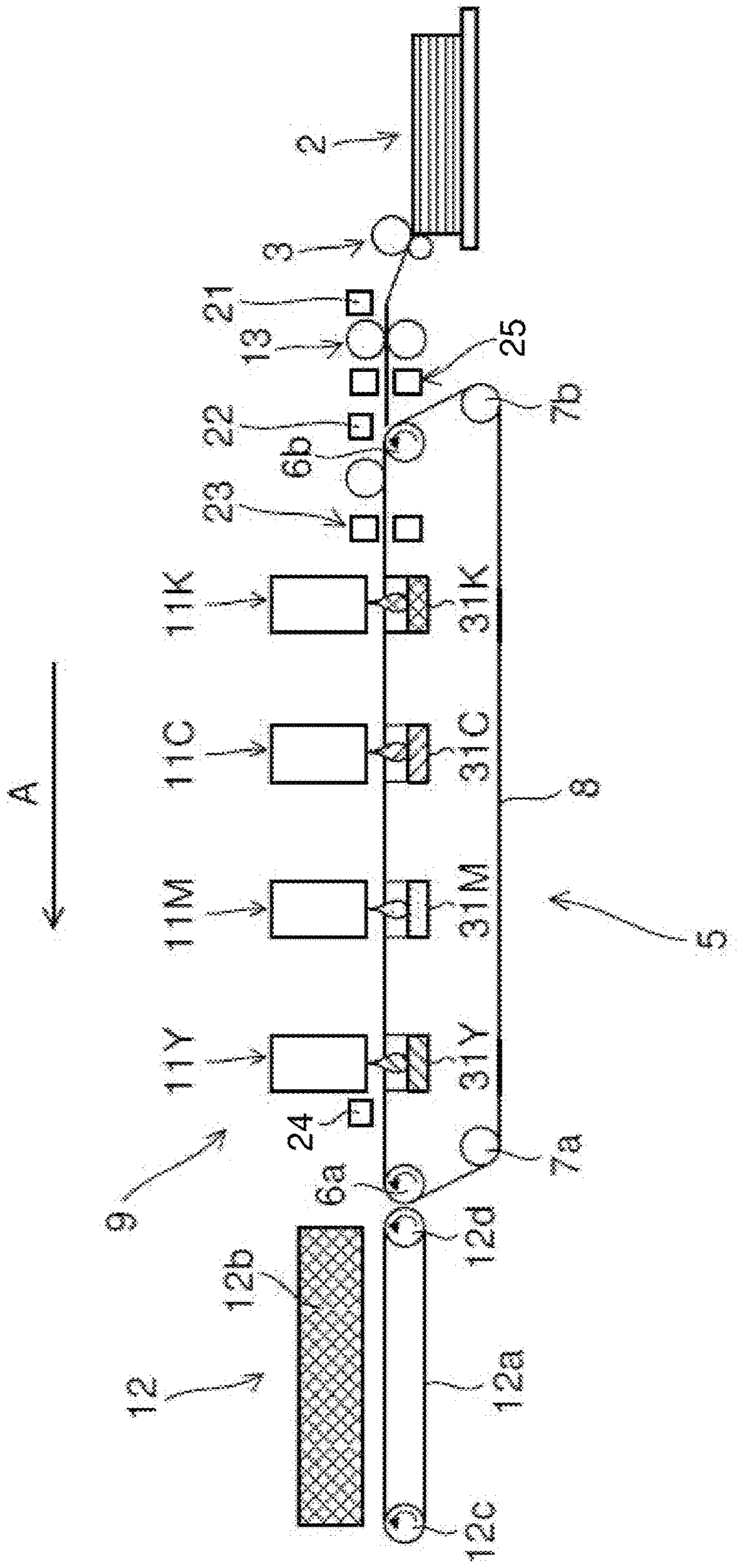
FIG. 3 is an explanatory view schematically showing a configuration in a vicinity of a conveyance path along which a sheet is conveyed from a paper feed cassette to a second conveyance unit via a first conveyance unit in the above-described printer.
Figure 4:
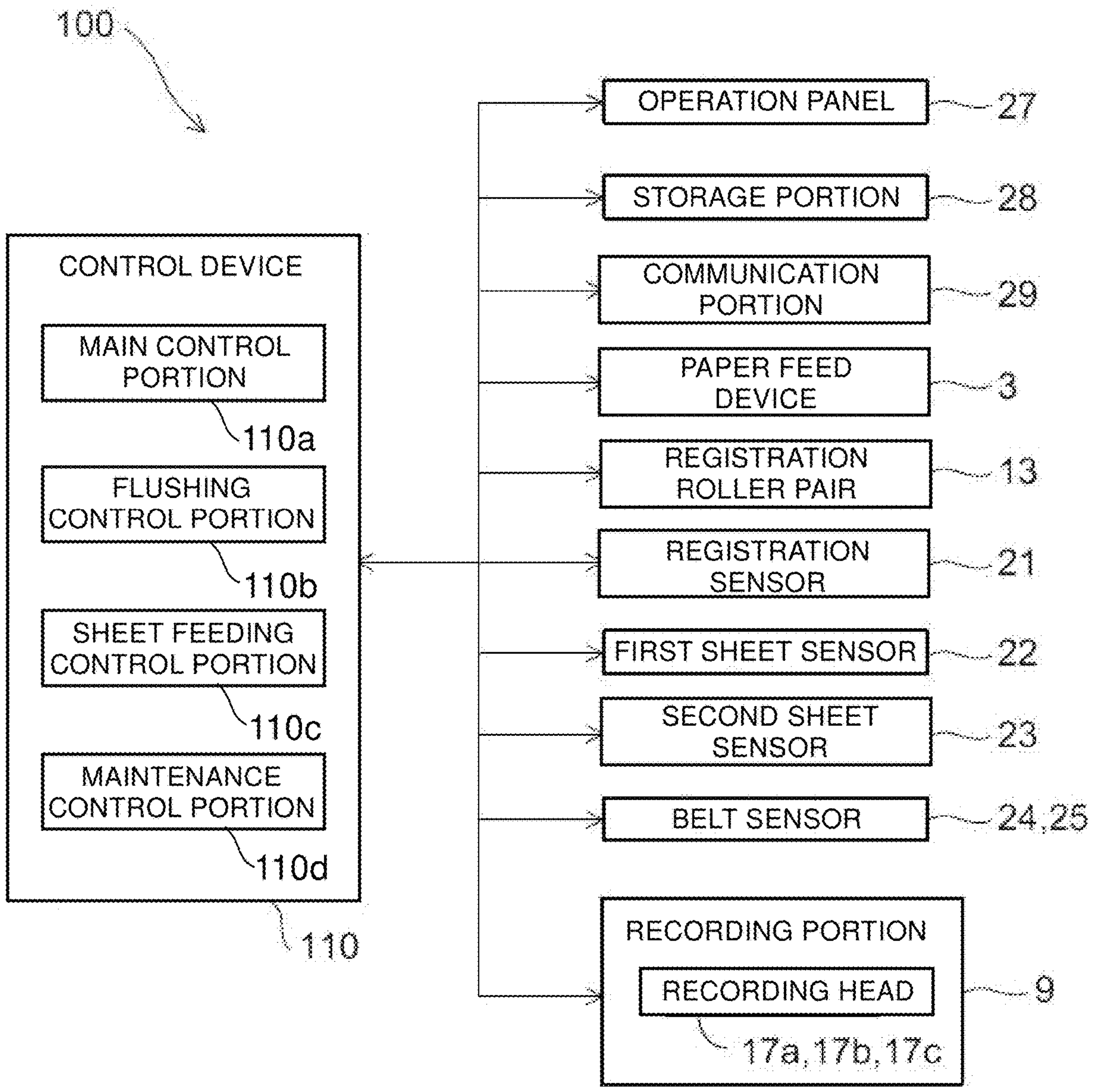
FIG. 4 is a block diagram showing a hardware configuration of a main part of the above-described printer.

FIG. 3 schematically shows a configuration in a vicinity of a conveyance path along which the sheet P is conveyed from the paper feed cassette 2 to the second conveyance unit 12 via the first conveyance unit 5. Furthermore, FIG. 4 is a block diagram showing a hardware configuration of a main part of the printer 100. In addition to the above-described configuration, the printer 100 further includes a registration sensor 21, a first sheet sensor 22, a second sheet sensor 23, and belt sensors 24 and 25.

The registration sensor 21 detects the sheet P being conveyed by the paper feed device 3 from the paper feed cassette 2 to the registration roller pair 13. The registration sensor 21 is positioned on an upstream side relative to the registration roller pair 13 in a feeding direction of the sheet P. Based on a result of the detection by the registration sensor 21, the control device 110 (for example, a sheet feeding control portion 110*c*) controls a timing for starting rotation of the registration roller pair 13. For example, based on a result of the detection by the registration sensor 21, the control device 110 controls a timing for feeding, to the first conveyance belt 8, the sheet P that has been subjected to skew (oblique feed) correction by the registration roller pair 13.

The first sheet sensor 22 detects a position of the sheet P in the width direction thereof, which is being sent from the registration roller pair 13 to the first conveyance belt 8. Based on a result of the detection by the first sheet sensor 22, the control device 110 (for example, the main control portion 110*a*) can perform control in which the ink is ejected through, among the ink ejection ports 18 of the recording heads 17*a* to 17*c* of each of the line heads 11Y to 11K, a set of ink ejection ports 18 corresponding to a width of the sheet P so that an image is recorded on the sheet P.

The second sheet sensor 23 detects passing of the sheet P fed to the first conveyance belt 8 by the registration roller pair 13. That is, the second sheet sensor 23 detects a position of the sheet P in the conveyance direction, which is being conveyed on the first conveyance belt 8. The second sheet sensor 23 is positioned on an upstream side of the recording portion 9 and on a downstream side of the first sheet sensor 22 in the sheet conveyance direction. Based on a result of the detection by the second sheet sensor 23, the control device 110 (for example, the main control portion 110*a*) can control a timing for ejecting the ink to the sheet P being conveyed to reach the position opposed to the line heads 11Y to 11K (the recording heads 17*a* to 17*c*) by the first conveyance belt 8.

The belt sensors 24 and 25 are each a reference detection sensor that detects a reference specifying area (not shown) provided on the first conveyance belt 8. The reference specifying area is a reference area for identifying every full revolution of the first conveyance belt 8. Since a positional relationship between the reference specifying area and openings 80 (see FIG. 8) is previously known, when the belt sensors 24 and 25 detect the reference specifying area on the first conveyance belt 8, based on a position of the reference specifying area thus detected, there can be detected respective positions of the openings 80 (opening groups 82) provided in the first conveyance belt 8 in the conveyance direction. Accordingly, the belt sensors 24 and 25 each function as an opening position detecting portion that detects the respective positions of the openings 80 of the first conveyance belt 8.

A configuration may be adopted in which, at an end of the first conveyance belt 8 in a belt width direction thereof, marks are formed beforehand at positions corresponding to the opening groups 82, and the belt sensors 24 and 25 detect the above-described marks, thus detecting the respective positions of the opening groups 82 (the openings 80) corresponding to the above-described marks.

The belt sensor 24 is positioned on a downstream side of the recording portion 9 in the sheet conveyance direction (the travelling direction of the first conveyance belt 8). In the sheet conveyance direction, the belt sensor 25 is positioned on an upstream side relative to the driven roller 6*b* over which the first conveyance belt 8 is stretched. While positioned between the driven roller 6*b* and the tension roller 7*b* in this embodiment, the belt sensor 25 may be positioned between the tension roller 7*a* and the tension roller 7*b*. The driven roller 6*b* is positioned on an upstream side with respect to the recording portion 9 in the travelling direction of the first conveyance belt 8. The belt sensor 24 also has a function equivalent to that of the second sheet sensor 23. Based on a result of the detection by the belt sensor 24 or 25, the control device 110 (for example, the sheet feeding control portion 110*c*) can control the registration roller pair 13 to feed the sheet P to the first conveyance belt 8 at a prescribed timing.

Furthermore, a position of the sheet P is detected by the plurality of sensors (the first sheet sensor 22, the second sheet sensor 23), and the reference specifying area on the first conveyance belt 8 is detected by the plurality of sensors (the belt sensors 24 and 25), and thus it also becomes possible to correct an error of the position thus detected or to detect an abnormality.

The first sheet sensor 22, the second sheet sensor 23, and the belt sensors 24 and 25, which are described above, may be each formed of a transmissive or reflective optical sensor, a CIS (contact image sensor), or the like.

In addition, the printer 100 may have a configuration including a meandering detection sensor that detects meandering of the first conveyance belt 8, in which based on a result of the detection thereby, the meandering of the first conveyance belt 8 is corrected.

Furthermore, the printer 100 further includes an operation panel 27, a storage portion 28, and a communication portion 29.

The operation panel 27 is an operation portion for accepting inputs of various settings. For example, by operating the operation panel 27, a user can input information on a size of the sheet P placed in the paper feed cassette 2, namely, a size of the sheet P to be conveyed by the first conveyance belt 8. Furthermore, by operating the operation panel 27, a user can also input the number of the sheets P to be printed or provide an instruction to start a printing job. Furthermore, the operation panel 27 also has a function as a notification device that provides a notification about an operation status (image recording or after-mentioned flushing) of the printer 100.

The storage portion 28 is a memory storing an operation program for the control device 110 and also storing various types of information and is configured by including a ROM (read-only memory), a RAM (random-access memory), a non-volatile memory, and so on. Information (for example, the information on the size of the sheet P or the number of the sheets P) set via the operation panel 27 is stored in the storage portion 28.

The communication portion 29 is a communication interface for transmitting and receiving information between itself and an external device (for example, a personal computer (PC)). For example, when a user operates a PC to transmit a printing command together with image data to the printer 100, the image data and the printing command, which are described above, are inputted to the printer 100 via the communication portion 29. In the printer 100, based on the above-described image data, the main control portion 110*a* can control the recording heads 17*a* to 17*c* to eject the ink so that an image is recorded on the sheet P.

Furthermore, the printer 100 of this embodiment includes the control device 110. The control device 110 is configured by including, for example, a CPU (central processing unit) and a memory. Specifically, the control device 110 includes the main control portion 110*a*, a flushing control portion 110*b*, the sheet feeding control portion 110*c*, and a maintenance control portion 110*d*. Needless to say, the control portions constituting the control device 110, which are formed of a single CPU, may also be formed of separate CPUs.

The main control portion 110*a* controls operations of the various portions of the printer 100. For example, driving of the rollers in the printer 100, ejection of the ink from the recording heads 17*a* to 17*c* during image formation (other than during flushing), and so on are controlled by the main control portion 110*a*.

Based on detection of the respective positions of the openings 80 by the belt sensor 24 or 25, the flushing control portion 110*b* controls the recording heads 17*a* to 17*c* to execute flushing.

The sheet feeding control portion 110*c* is a recording medium feeding control portion that controls the registration roller pair 13 as a recording medium feeding portion. For example, based on detection of the respective positions of the openings 80 by the belt sensor 24 or 25, the sheet feeding control portion 110*c* controls the registration roller pair 13. The sheet feeding control portion 110*c* can also control the registration roller pair 13 independently of detection of the respective positions of the openings 80 by the belt sensor 24 or 25 (regardless of the detection of the respective positions).

The maintenance control portion 110*d* controls the recording heads 17*a* to 17*c* to execute the above-described purging in which the ink is forcibly extruded through the ink ejection ports 18. When controlling the recording heads 17*a* to 17*c* to execute the purging, the maintenance control portion 110*d* also controls driving of the above-described maintenance unit 19 (for example, so that the maintenance unit 19 moves to below the recording portion 9 and retreats therefrom).

Furthermore, as shown in FIG. 3, the printer 100 includes the ink collectors 31Y, 31M, 31C, and 31K provided on an inner circumferential surface side of the first conveyance belt 8. When flushing is executed by the recording heads 17*a* to 17*c*, the ink collectors 31Y to 31K receive and collect the ink that has been ejected from the recording heads 17*a* to 17*c* and then passed through the openings 80 of the first conveyance belt 8. Accordingly, the ink collectors 31Y to 31K are each provided at a position opposed, via the first conveyance belt 8, to the recording heads 17*a* to 17*c* of a corresponding one of the line heads 11Y to 11K.

The second conveyance unit 12 includes a second conveyance belt 12*a* and a dryer 12*b*. The second conveyance belt 12*a* is stretched over two rollers that are a driving roller 12*c* and a driven roller 12*d*. The sheet P that has been conveyed by the first conveyance unit 5 and to which the ink has been ejected by the recording portion 9 so that an image is recorded thereon is conveyed by the second conveyance belt 12*a*, while being dried by the dryer 12*b* during the conveyance, to the above-described decurler portion 14.

2. Details of Ink Collector

Figure 5:
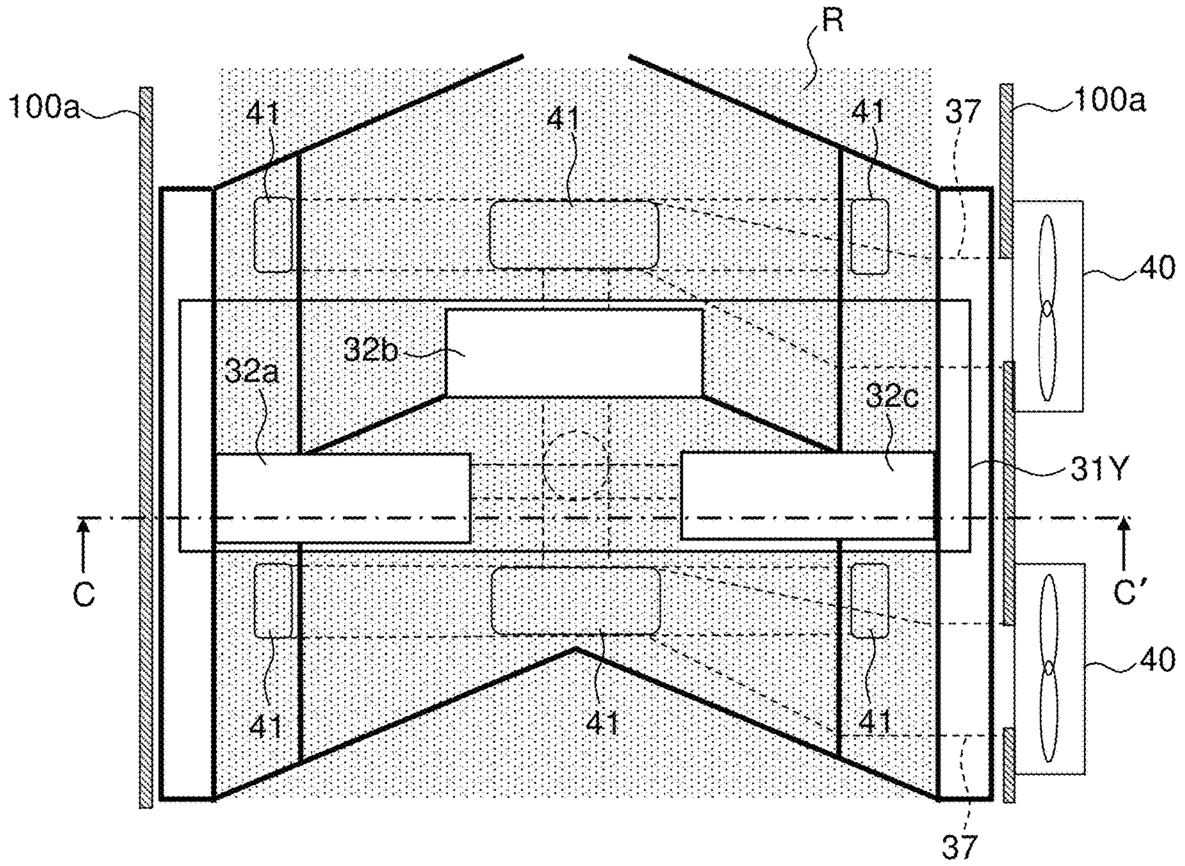
FIG. 5 is a schematic view showing an ink collector and a sheet conveyance region adjacent to the ink collector.

Next, a detailed description is given of a configuration of the ink collectors 31Y to 31K. FIG. 5 is a schematic view showing the ink collector 31Y and a sheet conveyance region adjacent to the ink collector 31Y. For the sake of convenience of explanation, the first conveyance belt 8 is not shown in FIG. 5. While the following description is directed to a configuration in a vicinity of the ink collector 31Y, the ink collectors 31M to 31K are also similar in configuration to the ink collector 31Y, and thus a duplicate description thereof is omitted.

The ink collector 31Y is disposed between a pair of side surface frames 100*a* so as to be opposed to the recording heads 17*a* to 17*c* constituting the line head 11Y (see FIG. 2). On an upper surface of the ink collector 31Y, there are provided ink receivers 32*a* to 32*c* that receive ink droplets ejected from the recording heads 17*a* to 17*c*, respectively.

A suction fan 40 that is a suction portion is installed in each of two locations on one of the side surface frames 100*a*, and one end of a suction duct 37 is connected thereto. The suction duct 37 has a plurality of suction ports 41 provided at the other end thereof. The suction ports 41 are disposed to be opposed to an inner circumferential surface of the first conveyance belt 8 (see FIG. 3). The first conveyance belt 8 has numerous air suction holes 8*a* (see FIG. 8) provided therein. When the suction fan 40 is activated, air on an outer circumferential surface side of the first conveyance belt 8 is sucked via the suction holes 8*a*. To be more specific, air in a sheet suction region R (a region shaded by dots in FIG. 5) excluding the ink receivers 32*a* to 32*c* is sucked. By this configuration, the sheet P is conveyed while being absorbed to the conveyance surface of the first conveyance belt 8 by suction air generated in the sheet suction region R.

Figure 6:
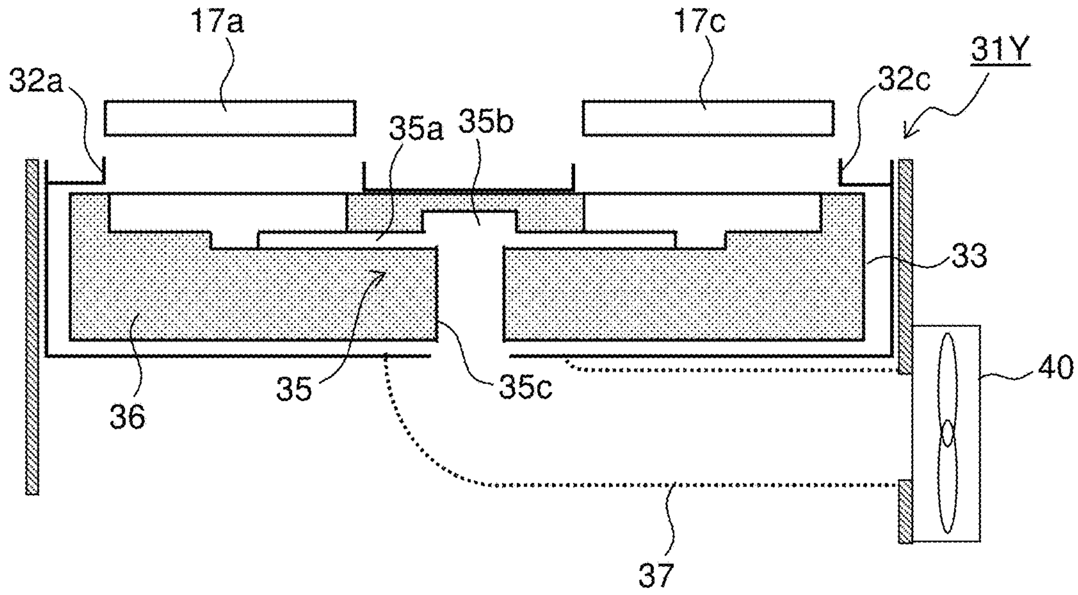
FIG. 6 is a sectional side view of the ink collector as cut in a direction orthogonal to a conveyance direction.
Figure 7:
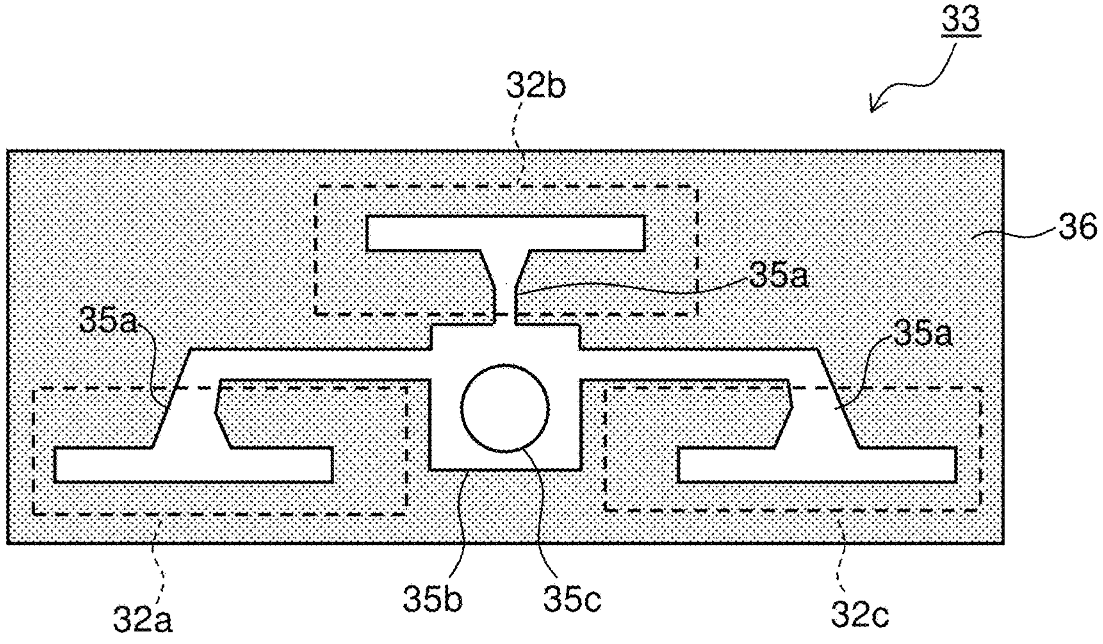
FIG. 7 is a sectional plan view of a waste ink tank constituting the ink collector.

FIG. 6 is a sectional side view of the ink collector 31Y as cut in a direction orthogonal to the conveyance direction (a sectional view taken in a direction of arrows C and C' in FIG. 5). FIG. 7 is a sectional plan view of a waste ink tank 33 constituting the ink collector 31Y. The waste ink tank 33 is disposed below the ink receivers 32*a* to 32*c*. A suction path 35 and an ink absorber 36 are provided in the waste ink tank 33.

The suction path 35 is formed by void spaces surrounded by the ink absorber 36 and includes first flow paths 35*a* and a merging chamber 35*b*. The suction path 35 may further include a second flow path 35*c*. The first flow paths 35*a* communicate with the ink receivers 32*a* to 32*c*. In the merging chamber 35*b*, three first flow paths 35*a* communicating with the ink receivers 32*a* to 32*c* merge together. The merging chamber 35*b* is linked to the suction fan 40. To be more specific, an upper end of the second flow path 35*c* communicates with the merging chamber 35*b*, and a lower end thereof is open in the suction duct 37. By the above-described configuration, the ink receivers 32*a* to 32*c* are connected to the suction fan 40 via the suction path 35 and the suction duct 37.

The ink absorber 36 is made of a porous material and is filled in an interior of the waste ink tank 33 other than the suction path 35. The porous material used to form the ink absorber 36 is required to have an open-cell structure capable of absorbing and retaining the ink (a liquid). Examples of the porous material having the open-cell structure include a foam resin material such as melamine sponge or urethane foam, a glass fiber material such as glass wool or rock wool, porous ceramics, a porous carbon fiber, and porous cellulose. Moreover, there can also be used a pulp material, a nonwoven fabric, and so on as long as they have rigidity and shape retainability sufficient to form the suction path 35. Among the above-described examples of the porous material, particularly preferred is melamine sponge since it can be easily processed and also has excellent solvent resistance.

Ink droplets contained in airflows passing through the suction path 35 impinge on inner wall surfaces of the first flow paths 35*a*, the merging chamber 35*b*, and the second flow path 35*c* and are absorbed by the ink absorber 36 forming the inner wall surfaces of the first flow paths 35*a*, the merging chamber 35*b*, and the second flow path 35*c*. The ink absorbed by the ink absorber 36 is directly stored in the waste ink tank 33.

3. Details of First Conveyance Belt

Figure 8:
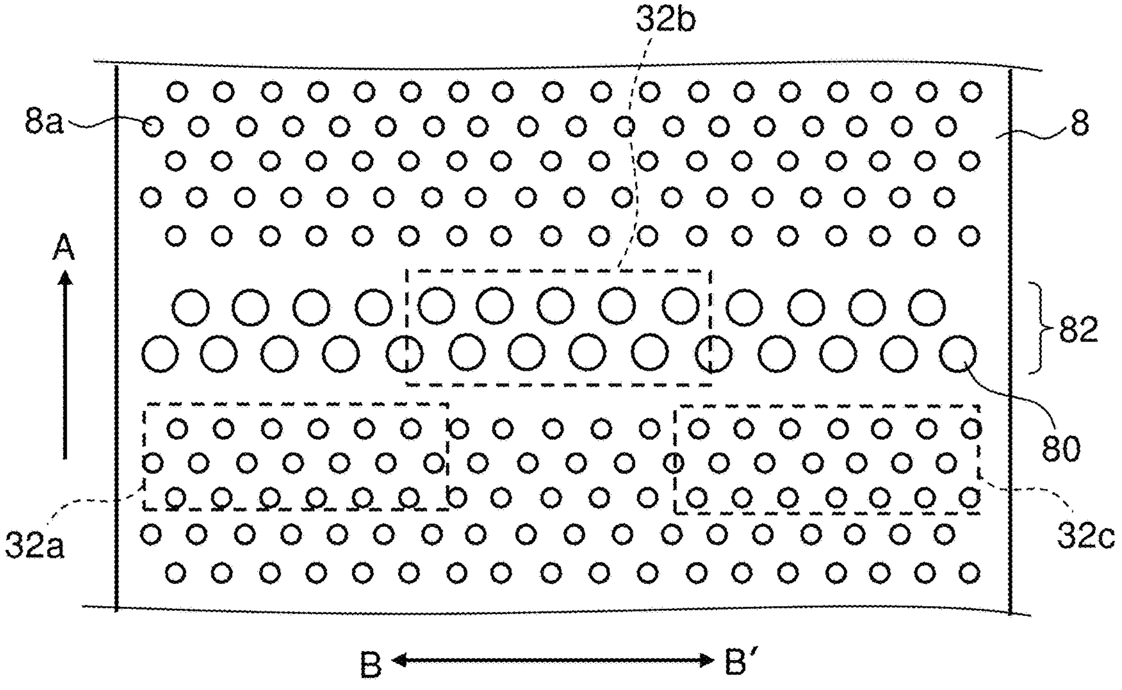
FIG. 8 is a partially enlarged view of a vicinity of openings of a first conveyance belt included in the first conveyance unit.

Next, a description is given of details of the first conveyance belt 8 of the first conveyance unit 5. FIG. 8 is a partially enlarged view of a vicinity of the openings 80 of the first conveyance belt 8 used in the printer 100.

This embodiment employs a negative pressure suction method in which the sheet P is conveyed while being absorbed to the first conveyance belt 8 by negative pressure suction using the suction fan 40. To this end, over an entire region of the first conveyance belt 8, the numerous suction holes 8*a* are formed to pass therethrough an airflow (suction air) for absorbing the sheet P to the first conveyance belt 8 by the negative pressure suction.

The first conveyance belt 8 has the plurality of openings 80 for passing therethrough the ink ejected through the nozzles (the ink ejection ports 18) of the recording heads 17*a* to 17*c* during flushing. In this embodiment, there are formed the opening groups 82 each composed of two rows of a plurality of openings 80 disposed along the belt width direction. In each of the opening groups 82, the openings 80 in one row are disposed so as to partly overlap the openings 80 in the other row in the belt width direction (the arrow B-B' direction).

While in this embodiment, as shown in FIG. 8, the openings 80 are circular in shape as viewed in plan, the openings 80 may have a rectangular shape or a hole shape elongated (for example, an elliptical shape) in the belt width direction (the arrow B-B' direction). The number of the openings 80 in the one row may be equal to the number of the openings 80 in the other row.

The plurality of opening groups 82, each of which is shown in FIG. 8, is formed within one cycle of the first conveyance belt 8. In the conveyance direction, the opening groups 82 are formed not at equal intervals but irregularly at respective positions corresponding to a size of the sheet P to be conveyed. That is, in the sheet conveyance direction, intervals between adjacent ones of the opening groups 82 are not constant but vary. In this case, a maximum interval between each pair of adjacent ones of the opening groups 82 in the sheet conveyance direction is longer than a length, in the sheet conveyance direction, of the sheet P of a printable minimum size (for example, an A4 size in landscape orientation) placed on the first conveyance belt 8.

When the recording heads 17*a* to 17*c* execute flushing, the ink ejected through the ink ejection ports 18 of the recording heads 17*a* to 17*c* passes through the openings 80 of any of the opening groups 82. Accordingly, the flushing is executed over the entire head width by the recording heads 17*a* to 17*c*, and thus it becomes possible to reduce clogging due to drying of the ink in all the ink ejection ports 18.

4. Configuration of Ink Absorber in Waste Ink Tank

Figure 9:
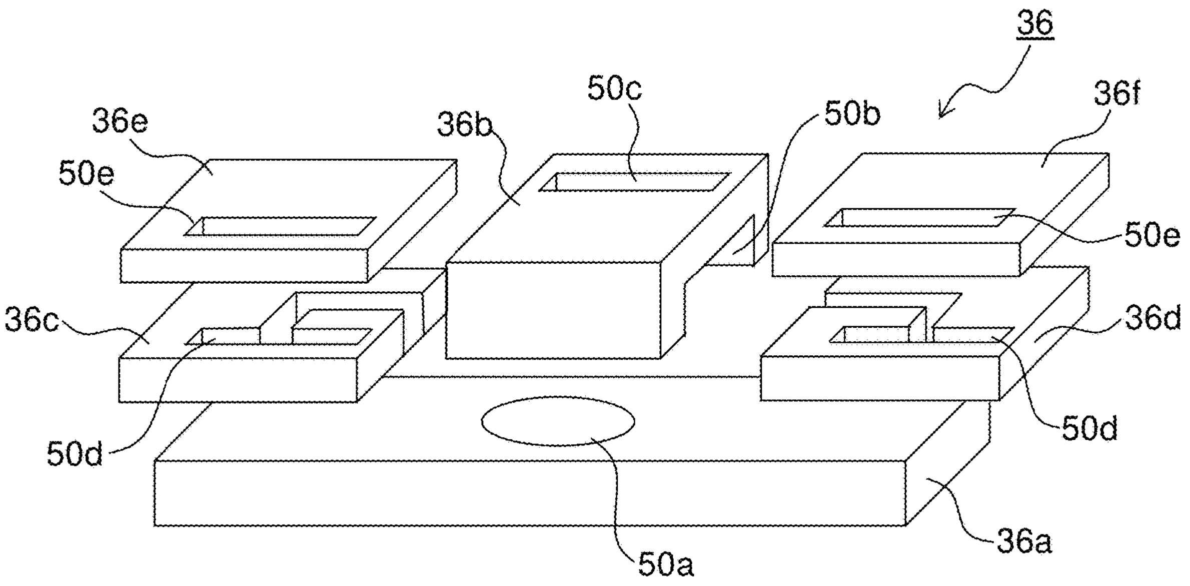
FIG. 9 is an exploded perspective view of an ink absorber disposed in the waste ink tank.

FIG. 9 is an exploded perspective view of the ink absorber 36 disposed in the waste ink tank 33. As shown in FIG. 9, the ink absorber 36 is configured by stacking six block-shaped absorbing members, i.e., first to sixth absorbing members 36*a* to 36*f*. Though not bonded to each other, the first to sixth absorbing members 36*a* to 36*f* are filled so as to fill up the inside of the waste ink tank 33, thus providing no possibility of misalignment therebetween.

The first absorbing member 36*a* is disposed on a bottom surface of the waste ink tank 33 and has a cylindrical groove 50*a* formed at a center thereof. The second absorbing member 36*b* is staked at the center of the first absorbing member 36*a* and has a rectangular groove 50*b* formed in a lower part thereof so as to horizontally penetrate therethrough and a rectangular groove 50*c* formed in an upper surface thereof so as to communicate with the groove 50*b*.

The third absorbing member 36*c* and the fourth absorbing member 36*d* are stacked on both ends of the first absorbing member 36*a* adjacently to the second absorbing member 36*b* and each have a groove 50*d* vertically penetrating therethrough. The fifth absorbing member 36*e* and the sixth absorbing member 36*f* are stacked on the third absorbing member 36*c* and the fourth absorbing member 36*d*, respectively, and each have a rectangular groove 50*e* vertically penetrating therethrough.

The first to sixth absorbing members 36*a* to 36*f* are stacked in the waste ink tank 33 so that the grooves 50*a* to 50*e* communicate with each other to form the suction path 35. To be more specific, the groove 50*a* forms the second flow path 35*c*, the groove 50*b* forms the merging chamber 35*b*, and the grooves 50*c* to 50*e* form the first flow paths 35*a*.

According to the above-described configuration, while passing through the suction path 35, misted ink sucked together with air from the ink receivers 32*a* to 32*c* is absorbed by the ink absorber 36 (the first to sixth absorbing members 36*a* to 36*f*) forming the inner wall surfaces of the first flow paths 35*a*, the merging chamber 35*b*, and the second flow path 35*c*. Thus, it is possible, by using a simple configuration, to efficiently separate misted ink contained in airflows from the airflows.

Accordingly, the misted ink is prevented from reaching the suction fan 40, and thus it is possible to suppress a failure of the suction fan 40. Furthermore, it is also possible to suppress contamination inside the printer 100 caused by the misted ink.

Moreover, disposing a filter for trapping the ink in the second flow path 35*c* or the suction duct 37 makes it unlikely that the ink adheres to the filter. This also eliminates the possibility that a force for holding the sheet P by absorption and a force for sucking ink droplets during flushing are decreased due to clogging of the filter.

Furthermore, in the waste ink tank 33, the ink is stored in a state of being absorbed by the ink absorber 36, and thus it becomes unlikely that the collected ink is scattered at a time of replacing the waste ink tank 33. It is, therefore, possible to suppress contamination inside the printer 100 and in an environment outside the printer 100.

Moreover, the first flow paths 35*a*, the merging chamber 35*b*, and the second flow path 35*c* can be formed merely by stacking the first to sixth absorbing members 36*a* to 36*f* in a prescribed order, and thus there is no need for a resinous member or the like used to form the suction path 35. It is, therefore, also possible to reduce man-hours for fabrication of the ink collectors 31Y to 31K and the number of components used and thus to achieve a cost reduction.

5. Modification Example of First Flow Path

Figure 10:
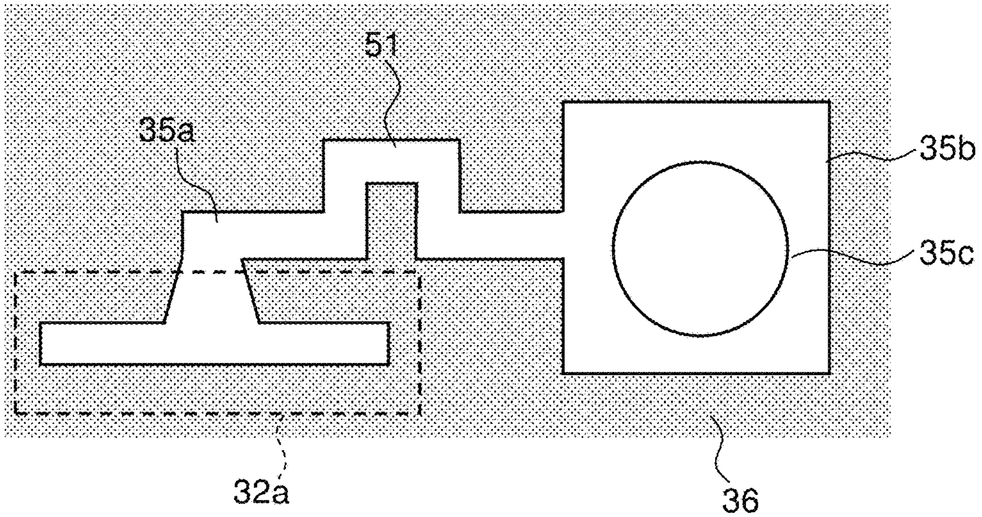
FIG. 10 is a view showing a modification example in which a first flow path includes a bent part.

FIG. 10 is a view showing a modification example in which one of the first flow paths 35*a* communicating with the ink receiver 32*a* includes a bent part 51. While not shown in FIG. 10, each of the other first flow paths 35*a* communicating with the ink receivers 32*b* and 32*c* also includes the bent part 51 of a similar configuration.

The bent part 51 is bent in a U shape (in an accordion shape), and thus it is likely that misted ink contained in airflows passing through the first flow paths 35*a* contacts an inner wall surface of the bent part 51. The misted ink that has contacted the inner wall surface of the bent part 51 flows down as ink droplets along the inner wall surface to be collected by the ink absorber 36 (see FIG. 6).

When the first flow paths 35*a* each include the bent part 51, it is possible to more efficiently separate misted ink contained in airflows flowing through the first flow paths 35*a* from the airflows. While herein the first flow paths 35*a* each include a single bent part 51, the first flow paths 35*a* may each include two or more bent parts 51.

Figure 11:
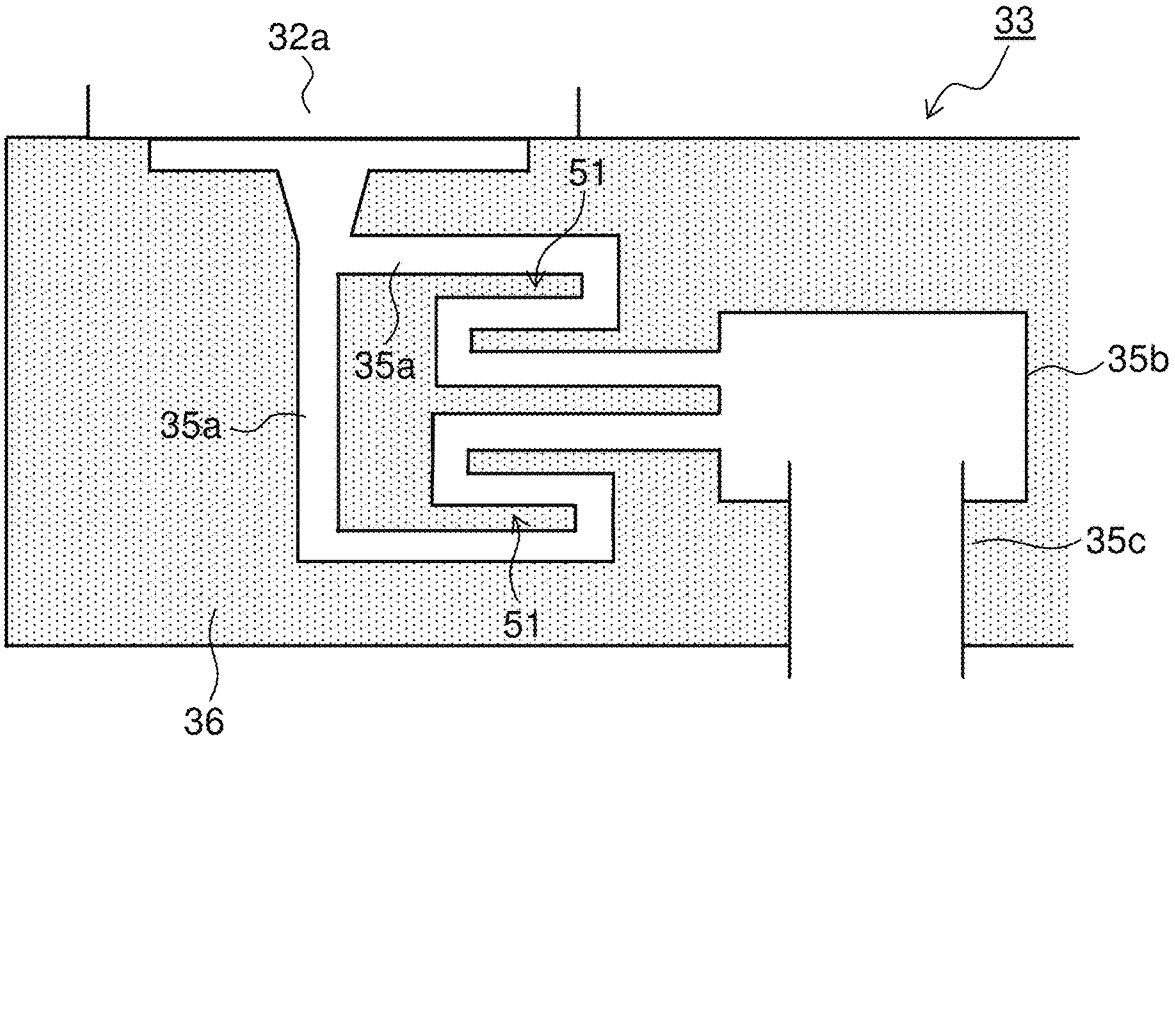
FIG. 11 is a sectional side view of a suction path in the waste ink tank, showing another example of the bent part formed in the first flow path.

FIG. 11 is a sectional side view of the suction path 35 in the waste ink tank 33, showing another example of the bent part 51 formed in each of the first flow paths 35*a*. In the example shown in FIG. 11, a bent part 51 is formed by folding each of the first flow paths 35*a* into layers stacked in an up-down direction.

Since each of the first flow paths 35*a* is folded into layers stacked in the up-down direction, it is possible to extend the each of the first flow paths 35*a* without requiring an increased space in a height direction. Furthermore, each of the first flow paths 35*a* is folded plural times (herein, twice) to have a folded part, and thus it becomes likely that misted ink contained in airflows passing through the first flow paths 35*a* contacts the folded part. Accordingly, it is possible, by using a simple and space-saving configuration, to efficiently separate misted ink contained in airflows from the airflows.

The bent part 51 is not limited in shape to the shapes shown in FIG. 10 and FIG. 11, and as long as one or more parts bent at substantially a right angle or an acute angle are included as the bent part(s) 51, efficiency in separating misted ink is improved compared with a structure without the bent part 51. For example, a shape formed by bending each of the first flow paths 35*a* in an L shape is also encompassed by the bend part 51 described herein. Furthermore, while in each of the examples shown in FIG. 10 and FIG. 11, the inner wall surface of the bent part 51 is bent at a right angle, the bent part 51 may have a rounded (curved) inner wall surface. In a case where the bent part 51 has the rounded inner wall surface, while separability of misted ink is somewhat decreased, a pressure loss caused when an airflow passes through the bent part 51 is decreased. This suppresses a decrease in the force for sucking ink droplets in each of the ink receivers 32*a* to 32*c*.

6. Others

The present disclosure is not limited to the foregoing embodiment and can be variously modified without departing from the spirit of the present disclosure. For example, while the foregoing embodiment describes the case where the sheet P is conveyed while being absorbed to the first conveyance belt 8 by the negative pressure suction using the suction fan 40 and the suction duct 37, a configuration may be adopted in which the first conveyance belt 8 is charged so that the sheet P is conveyed while being absorbed to the first conveyance belt 8 by electrostatic absorption (an electrostatic absorption method). In that case, the suction fan 40 is used only to suck the ink in the ink collectors 31Y to 31K.

Furthermore, while the foregoing embodiment describes the configuration using the first conveyance belt 8 in which the opening groups 82 each composed of the plurality of openings 80 are disposed irregularly at respective positions corresponding to a sheet size in the sheet conveyance direction, there can also be used the first conveyance belt 8 in which the opening groups 82 are arranged at constant intervals in the sheet conveyance direction (the arrow A direction)

Furthermore, while the foregoing embodiment describes the example using, as an inkjet recording apparatus, a color printer that uses ink of four different colors to record a color image, an ink discharge path of the embodiment of the present disclosure can be used also in a case of using a monochrome printer that uses black ink to record a monochrome image.

The present disclosure is usable in an inkjet recording apparatus such as an inkjet printer.

What is claimed is:

1. An inkjet recording apparatus, comprising:

a recording head including a plurality of nozzles for ejecting ink;

an endless conveyance belt that has a plurality of openings for the ink ejected from the recording head to pass through and conveys a recording medium;

a control portion that controls driving of the recording head and the conveyance belt so as to execute flushing in which, at a timing different from a timing contributing to image recording, the ink is ejected through the nozzles of the recording head to pass through any of the plurality of openings;

an ink collector that is disposed to be opposed to the recording head via the conveyance belt and collects the ink that has passed through the openings during execution of the flushing; and a suction portion that sucks air in the ink collector, wherein the ink collector includes:

a plurality of ink receivers that receives the ink that has passed through the openings;

a waste ink tank disposed below the ink receivers;

a suction path that is formed in the waste ink tank and leads from each of the ink receivers to the suction portion; and an ink absorber that is filled in the waste ink tank and absorbs the ink sucked from the ink receivers, and the suction path is formed by void spaces surrounded by the ink absorber, wherein the ink absorber is composed of a plurality of block-shaped ink absorbing members, and the suction path is formed by stacking the plurality of block-shaped ink absorbing members.

2. The inkjet recording apparatus according to claim 1, wherein the plurality of ink absorbing members have grooves each forming a part of the suction path, and when the plurality of ink absorbing members are stacked, the grooves are connected to each other to form the suction path.

3. The inkjet recording apparatus according to claim 1, wherein the suction path includes:

a plurality of first flow paths each connected to each of the plurality of ink receivers; and a merging chamber in which the plurality of first flow paths merges together and that is linked to the suction portion.

4. The inkjet recording apparatus according to claim 3, wherein the first flow paths each include a bent part bent at least once at substantially a right angle or an acute angle.

5. The inkjet recording apparatus according to claim 4, wherein the bent part is formed by bending each of the first flow paths in a U shape.

6. The inkjet recording apparatus according to claim 4, wherein the bent part is formed by folding each of the first flow paths plural times into layers stacked in an up-down direction.

7. The inkjet recording apparatus according to claim 3, wherein the suction path includes a second flow path having an upper end communicating with the merging chamber and a lower end communicating with the suction portion.

* * * * *